United States Patent [19]

Gilvary et al.

[11] Patent Number: 4,540,731
[45] Date of Patent: Sep. 10, 1985

[54] LOW TEMPERATURE CURE SEALANT

[75] Inventors: John P. Gilvary; John V. Lawton, both of South Bend, Ind.

[73] Assignee: Niles Chemical Paint Co., Niles, Mich.

[21] Appl. No.: 544,845

[22] Filed: Oct. 24, 1983

Related U.S. Application Data

[63] Continuation of Ser. No. 351,412, Feb. 23, 1982, abandoned, which is a continuation of Ser. No. 234,645, Feb. 17, 1981, abandoned.

[51] Int. Cl.$^3$ .................................................. C08K 5/54
[52] U.S. Cl. ..................................... 524/269; 524/524
[58] Field of Search ................................ 524/269, 524

[56] References Cited

U.S. PATENT DOCUMENTS 3,772,237 11/1973 Bullman ........................ 260/31.8 M Primary Examiner—Bernard Lipman
Attorney, Agent, or Firm—James D. Hall

[57] ABSTRACT

A vinyl plastisol sealant which is formed from a mixture of a dispersion resin, a blending resin, a solution-grade resin, a plasticizer, a filler and a silane adhesion promoter. The solution-grade resin is first predissolved in the plasticizer, and then mixed with the other components to produce a plastisol sealant which cures at a relatively low temperature.

9 Claims, No Drawings

LOW TEMPERATURE CURE SEALANT

This application is a continuation of application Ser. No. 351,412, filed 2-23-82, now abandoned, which is a continuation of application Ser. No. 234,645, filed 2-17-81, now abandoned.

SUMMARY OF THE INVENTION

This invention relates to a vinyl plastisol sealant having excellent adhesion and will have application especially to a vinyl plastisol sealant which may be cured at a relatively low temperature.

A sealant is a coating used to keep moisture and air from a surface which may contain abutments or openings. The sealant is therefore required to be highly adhesive with a high degree of integrity. Such a sealant may be a plastisol, an organosol, a plastigel or an organogel. A plastisol sealant is disclosed in U.S. Pat. No. 3,772,237, incorporated herein by reference. This sealant has two major drawbacks, namely, a high cure temperature (about 340° F.) and a tendency to leak into the top undercoated paint layers during curing. Additionally, the ketone-formaldehyde resin required in the sealant is of scarce availability.

The sealant of this invention utilizes a dispersion resin, a blending resin, a filler, a plasticizer and a silane adhesion promoter like the sealant of U.S. Pat. No. 3,772,237 but has added a solution type resin. The solution resin is a vinyl chloride/vinyl acetate co-polymer dissolved in a plasticizer. The addition of this resin acts with a talc filler to prevent permeation of the paint top coat and removes the need for the ketone-formaldehyde has permitted the use of lower temperatures for curing (approximately 230° F.), thereby saving in energy costs.

Accordingly, it is the object of this invention to provide a composition for a vinyl sealant curable at low temperatures.

Another object is to provide a sealant which will not leak through a top paint coat.

Other objects will become apparent upon reading the following description.

DESCRIPTION OF THE PREFERRED EMBODIMENT

The preferred embodiment described is not intended to be exhaustive or to limit the invention to the precise form disclosed. It is chosen and described in order to best explain the principles of the invention and its application and practical use to thereby enable others skilled in the art to best utilize the invention.

The primary ingredients of the composition include a vinyl co-polymer dispersion resin, a blending resin, a solution type resin, a filler, a plasticizer and an adhesion promoting silane. In addition, the thixiotrope may be added to prevent dripping or sagging of the sealant, and a stabilizer may be added if desired.

The dispersion resin is a commercially available paste resin such as vinyl chloride/vinyl acetate copolymer. The blending resin may be either a vinyl chloride homopolymer or a vinyl chloride/vinyl acetate copolymer. By definition, the blending resin will be of a much larger particle size than the dispersion resin to allow the dispersion resin to disperse within the blending resin forming a base material for the sealant. The ranges of particle size are from 0.5 to 2 microns for the dispersion resin and 10 to 115 microns for the blending resin, as defined in U.S. Pat. No. 3,772,237. Both the dispersion resin and the blending resin must have an inherent viscosity in excess of 0.9 when measured at 30° C. using 2 grams of resin and 100 ml of cyclohexanone. The dispersion resin preferred is PVC-74 from Diamond Shamrock Co. of Cleveland, Ohio. The preferred blending resin homopolymer is VC 260SS from Borden Chemical Co. of Leoninster, Mass. and the co-polymer is MC-85 from Goodyear Chemical of Akron, Ohio.

The solution type resin is a solution grade resin of vinyl chloride/vinyl acetate where the vinyl acetate composes 9–11% of the resin. This must first be dissolved in a plasticizer by agitation at 230° F. A preferred resin is a vinyl chloroide/vinyl acetate co-polymer sold under the designation VC-171C from Borden Chemical Company. The preferred plasticizer is DIDP (diisodecyl phthalate) in a ratio of 1 part resin to 17 parts plasticizer.

The fillers used in this composition may be selected from various alkaline earth metal carbonates such as calcium carbonate, magnesium carbonate and barium carbonate. Other fillers which are available include platy talcs, such as mica talc and dessicant type fillers, such as calcium oxide, calcium chloride, anhydrous calcium sulphates. The dessicant serves to hold moisture from the adhesion promoters. Moisture can cause a premature reaction of the silane adhesion promoter, thereby causing a loss in adhesion of the sealant.

The plasticizers used are preferably selected from phthalate plasticizers having six or more carbons. Although several plasticizers may be utilized, the preferred choice is DIDP (diisodecyl phthalate) as based on its effect on viscosity, viscosity stability and ultimate cure time. Other acceptable plasticizers are DOP (dioctyl phthalate) and DIOP (di iso octyl phthalate).

The adhesion promoters used in this composition are of the silane type. These are characterized by having at least one silicone atom and three hydrolyzable groups, such as alkoxyalkoxy's, having one to three carbon atoms, such as ethoxyethoxy or methoxy ethoxy. The silane adhesion promoters also contain an organo-functional group with at least one primary amino group in which the nitrogen contains at least two hydrogens bonded directly to the nitrogen atom. The nitrogen functionality is present in an organic group which is bonded to the silicone through a silicone-carbon bond. Such silane adhesion promoters are characterized as possessing a single organo-functional group and three hydrolyzable groups such that, when the silane is contacted with moisture contained on a surface or water which is embodied within the sealant formulation, the hydrolyzable groups are converted to silanol groups which in turn condense to form siloxane. When these adhesion promoters are incorporated into a sealant forumlation and the sealant is applied to a substrate, the adhesion promotere migrates to the surface to form a siloxane coating which acts to bond the sealant to the substrate. During the bonding, the sealant is heated to gain fusion.

When the bonding surface is untreated or not primed, the silane will contain only a single amino group. Preferred mono-amino silanes are gamma-aminopropyl (trimethoxy) silane available as A-1130 from Union Carbide Company of New York, N.Y., and delta-amino-n-butyl (trimethoxy) silane. When the bonding surface is treating or primed, a silane with both amino groups is used. Examples of such silanes are N-beta-aminoethyl-gamma aminopropyl (trimethoxy) silane, available as A-1120 from Union Carbide, n-trimethoxysilypropyl diethylene triamine, n-trimethoxysilypropyl, polyethyleneamine and the urea adducts of the aforementioned amino silanes.

The plastisol of this composition may include a stabilizer. The stabilizer may be selected from a standard list for plastisols which includes dibasic lead-, barium-, cadmium-, zinc- or calcium-phosphite. However, the stabilizer must be tested separately to insure it does not cause an adverse effect on adhesion or the rehological properties. The preferred stabilizer is a dibasic lead phosphite such as dyphos.

The sealants are generally applied over various geometric shaped substrates. Thus it is imperative that the sealant not sag when put in place prior to curing. This non-sagging characteristic is accomplished by the use of thixiotrope. Although asbestos is a prime example of a thixiotrope, a calcium-organic thixiotrope predispersed in DOP (dioctyl phthalate) at two parts thixiotrope to one part DOP is preferred. An example of one such thixiotrope is Ircogel #901 from Lubrizol Chemicals of Cleveland, Ohio. This product is chosen because it will give the necessary non-sag characteristics and is readily dispersed in the plastisol.

A working formulation of a preferred embodiment of the composition of this invention is as follows:

| Component | Specific Component | Parts by Weight | Range |
| --- | --- | --- | --- |
| Dispersion Resin | PVC-74 Co-Polymer | 90 | 10–100 |
| Blending Resin | VC-260SS | 10 | 10–100 |
| Dessicant | CaO | 10 | 1–100 |
| Filler | CaCO3 | 40 | 10–350 |
| Filler | mica talc | 20 | 10–350 |
| Thixiotrope | Ircogel #901 | 5 | 2–45 |
| Plasticizer | DIDP | 52 | 30–100 |
| Stabilizer | Dyphos | 2 | 0.5–4 |
| Solution Resin | *Vinyl chloride/vinyl acetate solution resin dissolved in DIDP in the ratio of 1:17 | 32 | 10–100 |
| Silane | Silane A-1120 | 1 | 0.25–5 |

*The ratio of vinyl chloride/vinyl acetate: DIDP may vary from 1:10 to 1:100 parts by weight.

The above formulation may be mixed on any adequate mixer which will produce a uniform product without a heat buildup. It is transferred to containers via pumping. The pump must be adequate to move the sealant and not build up excessive heat. It is then applied to the area to be sealed. It may be pumped, troweled, mulled, sprayed or otherwise placed in the desired end shape. At this point the sealant will stay in the shape and in place until fusion upon curing. The curing will occur within a range of 210° F. to 250° F.

Although this invention discusses the use of plastisols, it also will apply to organosols, organogels and plastigels with proper additions familiar to one versed in the manufacture of these compounds.

It is to be understood that the invention is not to be limied to the preceding but may be modified within the scope of the appended claims.

What I claim is:

1. A composition for a sealant paste with a low cure temperature comprising, in parts by weight:

from 10 to 100 parts of vinyl chloride/vinyl acetate copolymer dispersion resin having an inherent viscosity in excess of 0.9 when measured at 30° C. using 2 grams of resin and 100 ml. of cyclohexane;

from 10 to 100 parts of a blending resin, being one of vinyl chloride homopolymer and vinyl chloride/vinyl acetate;

from 10 to 100 parts of a solution of vinyl chloride/vinyl acetate solution grade resin, said solution grade resin being essentially free from products of ketone-aldehyde condensation, and a plasticizer wherein said vinyl acetate composes 9–11 percent of said resin and the ratio of said resin is from 1:10 to 1:100 parts of said plasticizer;

from 10 to 350 parts of a filler of one of an alkaline earth metal carbonate, a sulfate, and a platy talc filler;

from 0.25 to 5 parts of a silane adhesion promoter having an organo-functional trihydrolyzable silane wherein said organo-functional group is bonded to silicon by a carbon-to-silicon bond and the organo-functional group is an $NH_2$ group.

2. The composition of claim 1 and a thixiotrope at 2 to 45 parts by weight.

3. The composition of claim 1 wherein said plasticizer consists of a glass of phthalate esters having six or more carbons.

4. The composition of claim 1 and a dessicant from 5 to 50 parts by weight.

5. The composition of claim 1 wherein said silane consists of a class of amino hydrolyzable trialkoxy silanes.

6. The composition of claim 2 wherein said thixiotrope is one of asbestos, a platy talc and a class consisting essentially of organo-metals.

7. The composition of claim 3 wherein said class of phthalate plasticizers consists essentially of di-octyl phthalate, diisodecyl phthalate and diisooctyl phthalate.

8. A composition for a sealant past with a low cure temperature consisting essentially of:

a blending resin from 10–100 parts by weight;
a disperson resin from 10–100 parts by weight;
a dessicant from 5–50 parts by weight;
a filler from 10–350 parts by weight;
a thixiotrope from 2 to 45 parts by weight;
a plasticizer from 30 to 100 parts by weight;
a solution grade resin, said solution grade resin being essentially free from products of ketone-aldehyde resin condensation from 0.55 to 5.5 parts by weight predisolved in said plasticizer;
a stabilizer from 0.5 to 4 parts by weight; and
a silane adhesion promoter from 0.25 to 5 parts by weight.

9. The composition of claim 8 wherein said blending resin is a vinyl chloride/vinyl acetate co-polymer at 10 parts by weight having an interest viscosity in excess of 0.9 when measured at 30° C. using 2 grams of resin and 100 ml of cyclohexanone, said dispersion resin is a finely divided vinyl chloride/vinyl acetate co-polymer at 90 parts by weight having an inherent viscosity in excess of 0.9 when mesured at 30° C. using 2 grams of resin and 100 ml of cyclohexanone, said dessicant is calcium oxide at 10 parts by weight, said filler is a mixture of calcium carbonate at 40 parts by weight and mica talc at 20 parts by weight, said thixiotrope is a 2 to 1 mixture of a calium organic and dioctyl phthalate at 5 parts by weight, said plasticizer is diisodecyl phthalate at 52 parts by weight, said stabilizer is a di-basic lead phosphite at 2 parts by weight, said solution resin is a 1 to 17 mixture of solution grade vinyl chloride/vinyl acetate resin and diisodecyl phthalate at 32 parts by weight and said silane is N(beta-aminoethyl) gamma-aminopropyltrimethoxysilane at 1 part by weight.

* * * * *